United States Patent
Harper

[15] 3,690,294
[45] Sept. 12, 1972

[54] LIQUID DISTRIBUTING DEVICE
[72] Inventor: Samuel E. Harper, Sale, England
[73] Assignee: The Dunlop Company Limited, London, England
[22] Filed: July 8, 1970
[21] Appl. No.: 53,105

[30] Foreign Application Priority Data
July 25, 1969 Great Britain..........37,513/69

[52] U.S. Cl. ..................118/112, 118/125, 118/323, 118/325
[51] Int. Cl. ..........................B05c 5/00, B05c 11/02
[58] Field of Search........156/195; 118/325, DIG. 11, 118/125, 405, 323, 112; 134/64, 122, 163; 68/58

[56] References Cited

UNITED STATES PATENTS

| | | |
|---|---|---|
| 1,576,327 | 3/1926 | Hughes...............118/DIG. 11 |
| 1,605,326 | 11/1926 | Bundy................118/DIG. 11 |
| 2,098,852 | 11/1937 | Becker................118/DIG. 11 |
| 3,352,131 | 11/1967 | Smith............................68/58 |

*Primary Examiner*—John P. McIntosh
*Attorney*—Stevens, Davis, Miller & Mosher

[57] ABSTRACT

A liquid distributing device, which is particularly suitable for the application of a viscous liquid to a rotating elongated object, consisting essentially of a rotatable annular drum provided on its external surface with scooping means to take up a liquid from a container and in its interior with means to deposit liquid which is taken up by the scooping means and transferred to the interior on the surface of an object located in or passing through the drum when the drum is rotated. In the production of fiberglass-resin pipe, glass fiber material is laid onto a rotating cylindrical support, and the glass fiber material is coated with a polyester resin by passing the rotating support through a liquid distributing device from which the resin is deposited.

4 Claims, 4 Drawing Figures

LIQUID DISTRIBUTING DEVICE

The present invention relates to a liquid distributing device which is particularly suitable for the application of relatively viscous liquids to elongated objects, especially rotating cylindrical objects.

The present invention may be used in the application of a liquid resin to fibrous materials being assembled on a mandrel in the course of production of a reinforced resinous pipe and for convenience is further described with particular reference to this use.

Reinforced resinous pipe may be made by building a laminate of fibrous material and synthetic resin on a mandrel, the resin being applied to the fibrous material prior to or concurrently with the building operation. The application of liquid resins to fibrous materials presents problems associated with the need to obtain complete wetting of the fibers and with the nature of the resins used. These latter are usually polyester resins which in the liquid condition are viscous, will adhere to most materials and are self-hardening on exposure at ambient temperatures. The fibrous materials usually used in the production of the reinforced pipe are glass fiber rovings or textiles. When such materials are applied in tape form by spirally laying from a stationary source onto a rotating mandrel, they may conveniently be passed through a bath of resin to effect complete impregnation. However, when such materials are applied from a moving source, e.g., a rotating array surrounding a mandrel or partly-constructed pipe, such immersion methods are less convenient and it is therefore more usual to apply resin to the fibers as they are being assembled on a mandrel. Resin may, for example, be delivered to the appropriate location by means of piping from an adjacent source and allowed to flow around the partly-constructed pipe as it rotates. Surplus resin can be collected in a receptacle beneath the pipe and returned to the delivery source by a pump or other means. However, this method is wasteful in operation and requires a considerable excess of resin to ensure continuous operation. Furthermore, at the termination of operations the pipework of the dispensing and recirculating systems must be cleaned to prevent the accumulation of hardened resin which would interfere with subsequent working. If resin is allowed to harden in the pipework of the dispensing and recirculating systems, considerable difficulty is experienced in ensuring its complete removal.

The present invention provides a means of ensuring a constant delivery of resin which avoids the problems associated with the previously known means discussed above.

The present invention in one aspect provides a liquid distributing device comprising a rotatable annular drum provided on the external surface thereof with scooping means to take up a liquid from a container and in the interior thereof with means whereby liquid which is taken up by the scooping means and transferred to the interior is deposited on the surface of an object located in or passing through the drum when the drum is rotated.

The present invention in another aspect provides a method for the production of fiberglass-resin pipe in which glass fiber material is laid onto a cylindrical support rotating about its longitudinal axis, the glass fiber material is coated with a polyester resin by passing the rotating support through a liquid distributing device as specified in the preceding prargraph from which the resin is deposited, and the polyester resin is subsequently cured. In the production of an elastomer-lined pipe, the cylindrical support is an elastomer sleeve supported on a mandrel.

The means provided in the device to take up a liquid from a container is conveniently in the form of one or more scoops located on the external surface of the drum. As the device rotates, liquid is taken up from a container and fed to the interior of the drum. The means to deposit the liquid is conveniently in the form of baffles located in the interior of the drum and preferably welded to opposing sidewalls of the drum. When the liquid has been fed to the interior of the drum, as the device rotates the liquid moves around the interior until it reaches a position where at least some of the liquid falls via the baffles onto the surface of the object and some may fall into another part of the interior of the drum. When the device is continuously rotated, any liquid which has fallen into another part of the drum is carried around until the drum is again in a position where this liquid falls via the baffles.

It will be appreciated that the external surface of the annular drum extending between the sidewalls of the drum, and/or the apertures in the sidewalls, may be curved, e.g. circular, in cross-section or may be polygonal in cross-section so long as they are shaped so that means such as baffles disposed in the interior of the drum may readily cause liquid fed to the interior to fall onto the surface of the object passing through the drum.

The device of this invention is particularly suitable for applying a viscous liquid to an elongated object, particularly a cylindrical object.

When used to deposit a viscous liquid such as a polyester resin on the surface of an object passing through the aperture of the drum, the drum is used in conjunction with means to remove excess liquid from the surface and ensure uniform coating of the surface, such as an annular wiper, which is located adjacent the aperture in the sidewall of the drum where the object emerges, and bears against the surface exerting a wiping action. The wiper preferably has a portion flanged in the direction of movement of the object so that the surface of the flanged portion exerts a smooth wiping action of the surface of the object. As well as exerting a wiping action, the wiper also supports the cylindrical object as it passed through the device.

Various embodiments of the invention are described below by way of example, with particular reference to the use of the liquid distributing device in the production of fiberglass resin pipe, and with reference to the accompanying drawings, in which.

Figure 1:
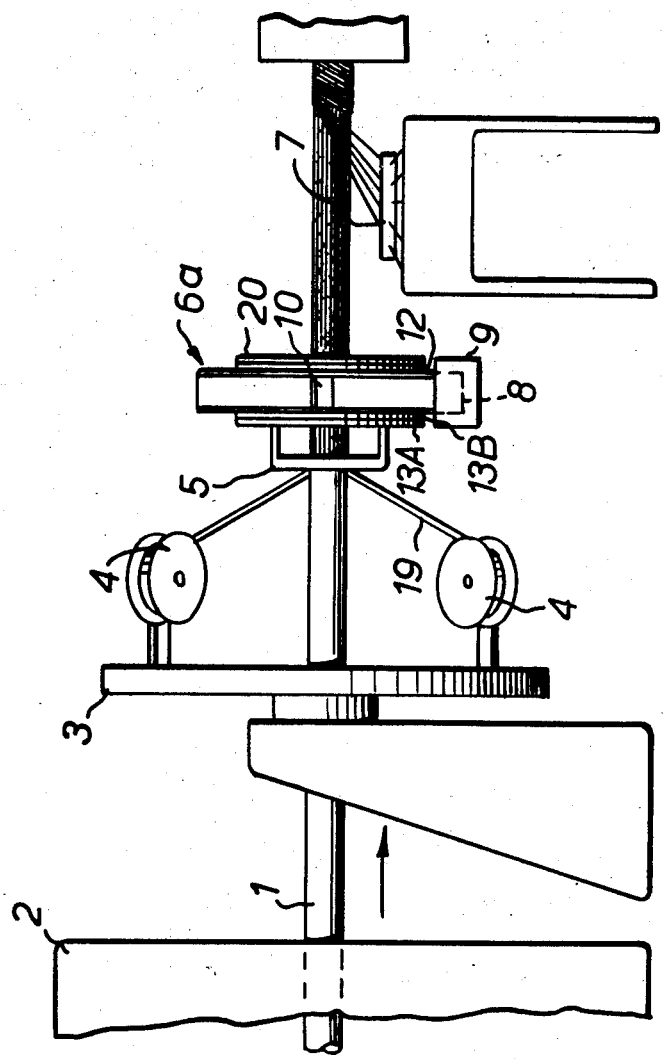
FIG. 1 is a side elevation of apparatus including a liquid distributing device of the invention used to produce a fiberglass resin pipe.

As illustrated in FIG. 1, a sleeve 1 of unvulcanized rubber composition is supported on a rigid mandrel which is rotated about its longitudinal axis and propelled, in the direction indicated, by the machine 2. It is passed through a winding ring 3 which is connected to the machine 2 (means not shown) and, rotated by the machine 2 at the same speed as the mandrel. The winding ring carries a multiplicity of dispensers 4 each containing a wound package of substantially weftless glass fiber tape 19. The sleeve is then passed through a guiding ring 5 which is rigidly attached to the winding ring 3 (means not shown). The tape 19 is unwound from each of the dispensers 4 and passed through the guiding ring 5 which lays the tape on the surface of the rubber sleeve 1. The sleeve is passed through a resin distributor 6a which is a liquid distributing device of the present invention and is demountably attached to the guiding ring 5 via a pair of coupling rings 13A and 13B. The distributor continuously applies liquid polyester resin to the weftless glass fiber tapes as they are laid onto the sleeve 1. From the resin distributor, the sleeve is passed through a stationary cord-laying apparatus 7, where resin-impregnated glass fiber rovings are spirally wrapped around it. Subsequently, further reinforcement may be applied or the covered sleeve may be passed immediately into a heat treatment chamber to accelerate cross-linking of the polyester resin, and complete formation of the rubber-lined fiberglass-resin pipe.

Figure 2:
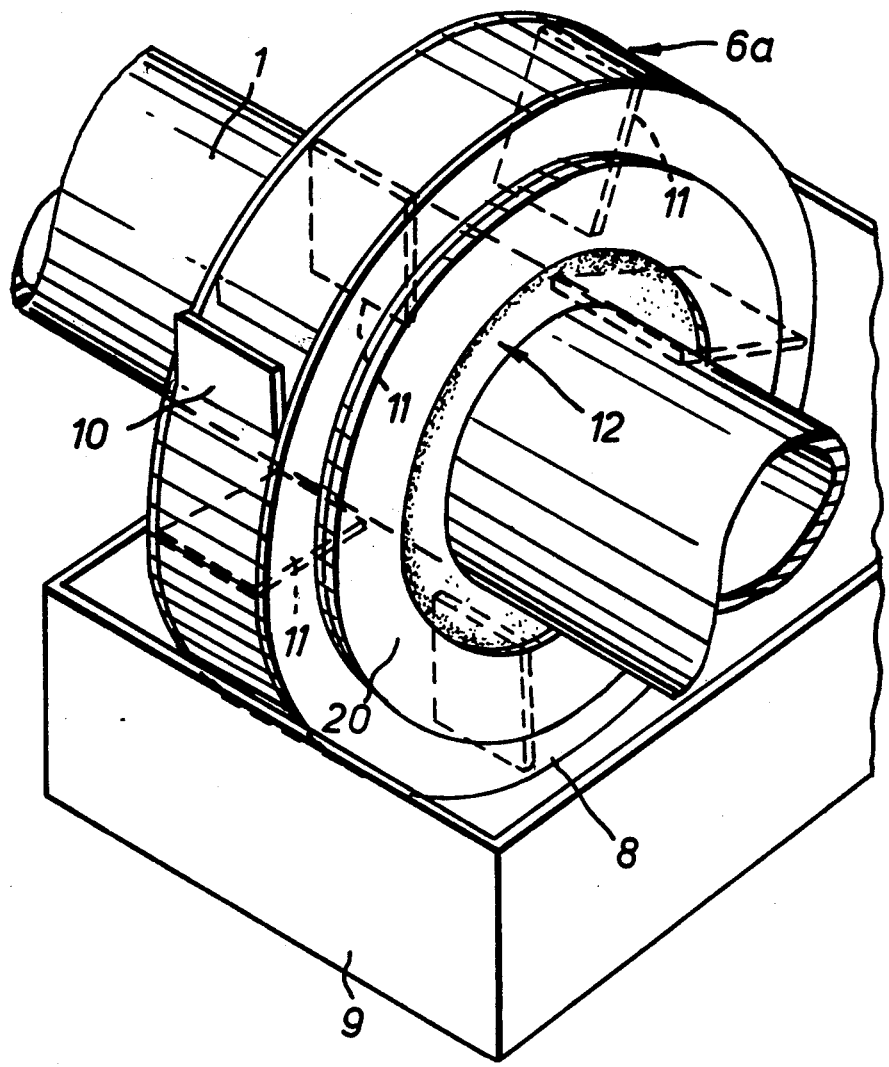
FIG. 2 is a perspective view of the liquid distributing device of FIG. 1 through which is being passed a partially formed fiberglass-resin pipe.

FIG. 2 illustrates the device 6a of FIG. 1 in greater detail. The resin distributing device 6a is attached to the guiding ring 5 (not shown), and is, in essence, a shallow annular metal drum adapted to rotate in a vertical plane about a cylindrical mandrel. It is provided with means for distributing controlled quantities of liquid polyester resin onto the surface of the fiberglass-covered sleeve 1 travelling through the device. The lower part 8 of the drum is immersed in the liquid resin contained in a shallow tray 9. The drum is provided with a scoop 10 which, as the device rotates, takes up resin from the tray 9 and conveys it through the gap in the surface of the drum to the interior of the drum. A multiplicity of metal baffles 11 inside the drum, welded to opposing sidewalls, causes the resin to be deposited on the pipe. Surplus resin which falls from the pipe returns to the lower part of the drum. Excess resin remaining on the pipe is removed by the wiping action exerted by a relatively flexible seal 12 which is an annular member cut from polytetrafluoroethylene sheet approximately 1.5 mm. thick, supported in position by an annular metal backing plate 20, the wiper and backing plate being attached to the device 6a by means of bolts (not shown).

Continuous operation of the resin distributor requires that the resin tray 9 be replenished as and when required. The distributor is attached via coupling rings 13A and 13B to the winding ring 3 so that it is rotated by the machine 2, and therefore requires no separate power source or activating means. It is substantially self-scouring but if necessary the complete assembly can be easily removed from a machine and cleaned by conventional methods.

Figure 3:
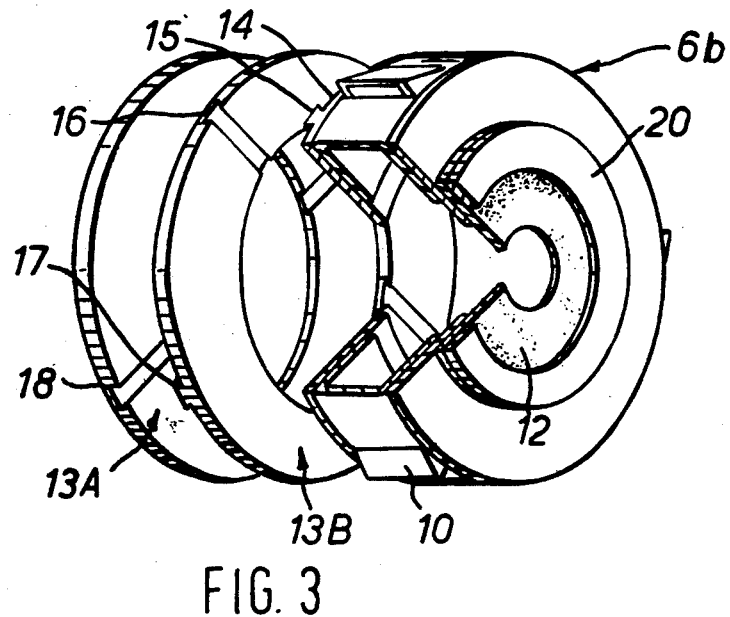
FIG. 3 is a part exploded view, with parts broken away, of another device of the invention.

In a further embodiment of the invention illustrated in FIG. 3, the device 6b is provided with a number of scoops in place of the single scoop of the device 6a of FIG. 2.

FIG. 3 also shows the coupling rings 13A and 13B in greater detail. It will be understood that, during its passage through the apparatus of FIG. 1, a pipe being produced is relatively unsupported along its length. During its passage, a pipe may therefore develop an eccentricity of rotation. The coupling rings 13A and 13B are provided to cater to any such eccentricity by permitting the resin distributor 6A or 6B to follow the rotational variations of the pipe. The annular back plate 14 of the resin distributor is provided with two diametrically aligned dove-tail projections 15. Coupling ring 13B is provided with two similarly shaped slots 16. The dove-tails 15 are a sliding fit in the slots 16 and thus when the two are assembled together the distributor is free to move, in the direction of the slots, across the face of the coupling ring. A similar dovetail arrangement is provided between the two coupling rings 13A and 13B, the ring 13B being provided with dove-tail projections 17 and the ring 13A with corresponding slots 18, but in this case the direction of any movement is at 90° to that between the ring 13B and the distributor since the projections 17 and slots 18 are at an angle of substantially 90° to the projections 15 and 16.

As shown in FIG. 1, coupling ring 13A is rigidly attached to the rotatable guiding ring 5 and therefore describes the same rotational movement as the winding ring 3 to which the guiding ring is rigidly attached (means not shown). Rings 13A and 13B are, however, moveably attached to each other and ring 13B is moveably attached to the distributor. In operation, a pipe passing through the distributor is in peripheral contact with the seal 12. Any localized pressure on the seal, caused by eccentricity of rotation, causes the compensating movement to occur between one dove-tail member and the appropriate slot. Thus a self-regulating system is provided which ensures a more even distribution of resin on the pipe.

Figure 4:
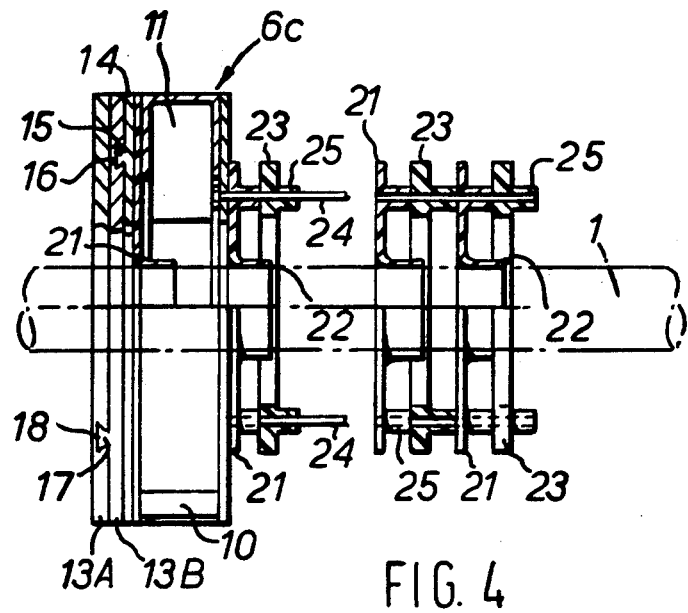
FIG. 4 is a part exploded sectional view of a modification of the device of FIG. 3.

A further modified liquid distributing device of the invention is illustrated in FIG. 4. The modified device 6c is similar to that illustrated in FIG. 3, except that five annular wiper seals 21 are now attached to the resin distributor, only three of the wipers being shown in FIG. 4. These provide increased support for the covered elastomer sleeve as it is passed through the resin distributor and provide an increased wiping action, thus resulting in a more even resin coating. The wipers 21 each have a portion 22 which is flanged in the direction of movement of the resin-coated sleeve and exerts the wiping action on the surface of the coated sleeve. Each of the wipers 21 is supported in position by a backing ring 23. The wipers and backing rings are all attached to the resin distributor 6C by means of bolts 24 and spaced apart by means of tubular spacer members 25 through which the bolts pass, only two of the bolts and two sets of the spacer members being shown in FIG. 4. A further wiper 21 is inserted between the back plate 14 of the resin distributor and the remainder of the distributor to prevent resin from being carried back towards the glass fiber tape laying apparatus. All of the wipers 21, the backing rings 23 and the spacer members 25 were made from polytetrafluoroethylene.

We claim:

1. A liquid distributing device comprising a rotatable annular drum having an external surface provided with scooping means to take up a liquid from a container and an interior provided with means whereby liquid which is taken up by the scooping means and transferred to the interior is deposited on the surface of an object located in or passing through the drum when the drum is rotated, the drum having a first sidewall with an external surface thereof having two diametrically aligned dove-tail projections, a first ring coupled to the sidewall, said ring having in a surface thereof slots in which the projections of the sidewall are slidably accommodated and on another surface thereof two aligned dove-tail projections, a second ring coupled to the first ring, the second ring having in a surface thereof slits in which the projections of the first ring are slidably accommodated, the projections of the first ring and slots of the second ring being at an angle of about 90° to the projections of said sidewall and the slots of the first ring, and the drum having attached thereto on the other sidewall thereof an annular wiper which bears against an object passing through the drum whereby when a rotating object passes through the drum and comes into contact with the wiper, any localized pressure on the wiper caused by eccentricity of rotation of the object causes a compensating movement between the dove-tail projections of the first sidewall or the first ring and the corresponding slots.

2. A device according to claim 1, in which the means by which the liquid is deposited comprises baffles disposed in the drum between opposite sidewalls thereof.

3. A device according to claim 1 in which the wiper has a flanged portion to extend substantially in the direction of movement of the surface of the object and bear against said surface.

4. A device according to claim 1, in which the wiper is fitted to the drum and supported in position by an annular backing member.

* * * * *